US009414550B2

(12) United States Patent
Chilton (10) Patent No.: US 9,414,550 B2
(45) Date of Patent: *Aug. 16, 2016

(54) DRY CHAMBER SLUG AND SNAIL BARRIER

(71) Applicant: Robert P. Chilton, Salt Lake City, UT (US)

(72) Inventor: Robert P. Chilton, Salt Lake City, UT (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/260,473

(22) Filed: Apr. 24, 2014

(65) Prior Publication Data

US 2014/0223805 A1    Aug. 14, 2014

Related U.S. Application Data

(63) Continuation-in-part of application No. 13/292,805, filed on Nov. 9, 2011, now Pat. No. 8,793,930.

(51) Int. Cl.
*A01M 29/30* (2011.01)
*A01G 13/10* (2006.01)
*A01M 25/00* (2006.01)

(52) U.S. Cl.
CPC ............. *A01G 13/105* (2013.01); *A01M 29/30* (2013.01); *A01M 25/008* (2013.01)

(58) Field of Classification Search
CPC ..... A01G 13/105; A01G 1/08; A01M 25/008; A01M 2200/011
USPC .................... 43/107–108, 121, 131
See application file for complete search history.

(56) References Cited

U.S. PATENT DOCUMENTS

| 1,373,827 | A |   | 4/1921  | Watson      |            |
|-----------|---|---|---------|-------------|------------|
| 4,319,423 | A |   | 3/1982  | Judd        |            |
| 4,566,219 | A |   | 1/1986  | Firth       |            |
| 5,170,584 | A |   | 12/1992 | Perry       |            |
| 5,175,958 | A |   | 1/1993  | Wedemeyer   |            |
| 5,274,950 | A |   | 1/1994  | Roberts     |            |
| 5,390,441 | A |   | 2/1995  | Pence       |            |
| 6,021,599 | A | * | 2/2000  | Matz ........................ | A01G 1/08 47/33 |
| 6,219,960 | B1 | * | 4/2001 | Contadini ............. | A01M 1/026 43/107 |
| 6,230,435 | B1 |   | 5/2001 | Carman      |            |
| 6,691,454 | B1 |   | 2/2004 | Conroy      |            |
| 7,434,788 | B2 |   | 10/2008 | Foster     |            |
| 7,647,723 | B2 |   | 1/2010 | Klein et al.|            |

OTHER PUBLICATIONS

Non-final Office Action mailed Oct. 21, 2013, for U.S. Appl. No. 13/292,805, filed Nov. 9, 2011.
Final Office Action mailed Mar. 13, 2014, for U.S. Appl. No. 13/292,805, filed Nov. 9, 2011.
Notice of Allowance and Fee(s) Due mailed Apr. 24, 2014, for U.S. Appl. No. 13/292,805, filed Nov. 9, 2011.

* cited by examiner

*Primary Examiner* — Marc Burgess
(74) *Attorney, Agent, or Firm* — Stoel Rives LLP (57) ABSTRACT

This disclosure relates to systems and methods for providing a barrier that deters or prevents terrestrial molluscs, such as slugs and snails, from entering a garden or other vegetation area. A barrier may include an inverted channel, a portion of which forms a dry chamber configured to retain salt, rock salt, a salt-based mollusc deterrent, or other mollusc deterrents, poisons, and/or baits. Mesh may be used to retain the deterrent within the dry chamber. In various embodiments, a bead or other feature may help prevent liquids, such as water, from wicking into the dry chamber.

19 Claims, 11 Drawing Sheets

DRY CHAMBER SLUG AND SNAIL BARRIER

RELATED APPLICATIONS

This application is a continuation-in-part of, and claims priority to, U.S. patent application Ser. No. 13/292,805, filed on Nov. 9, 2011, titled DRY CHAMBER SLUG AND SNAIL BARRIER, which application is hereby incorporated by reference in its entirety.

TECHNICAL FIELD

This disclosure relates to systems and methods for minimizing damage to horticultural, agricultural, and/or gardening foliage caused by terrestrial molluscs, such as slugs, snails, and the like.

BRIEF DESCRIPTION OF THE DRAWINGS

Non-limiting and non-exhaustive embodiments of the disclosure are described herein, including various embodiments of the disclosure with reference to the drawings described below.

References to the figures throughout the description are for convenience only. As provided herein, embodiments of the systems and methods described herein may include one or more additional components or features not illustrated in the figures. Similarly, one or more of the illustrated components or features may be omitted and/or substituted for a different component or feature in any of the embodiments described herein. Furthermore, the described features, structures, or characteristics on any embodiment may be combined in any suitable manner in one or more alternative embodiments, including all possible permutations thereof.

DETAILED DESCRIPTION

The present disclosure includes various systems and methods for deterring terrestrial molluscs (e.g., slugs and snails) from traversing a barrier. The term "terrestrial mollusc" is used herein to refer to molluscs such as slugs and snails that eat non-aqueous vegetation. For example, terrestrial molluscs include land-based slugs and snails as well as aquatic snails that emerge from water to eat or otherwise harm non-aquatic vegetation. The term "mollusc" is alternatively spelled "mollusk," and the two terms are considered synonymous.

A terrestrial mollusc barrier may be used to define a protected region within which terrestrial molluscs are prevented or substantially deterred from entering and consuming or otherwise damaging the vegetation therein. Thus, a terrestrial mollusc barrier may prevent and/or deter slugs and snails from damaging foliage within the protected region. In various embodiments, the barrier may be made entirely of post-consumer recycled plastic in multiple lengths, thicknesses, and depths. Any of a wide variety of materials and/or construction methods may be utilized.

The terrestrial mollusc barrier may include an inner wall portion attached to an inverted U-shaped portion. The U-shaped portion may alternatively be square, oblong, round, or another shape. The U-shaped portion may serve as an inverted chamber within which a mollusc deterrent, such as a slug and/or snail bait or deterrent, may be retained. In one embodiment, a mesh retainer may be used to retain a salt-based deterrent within the inverted chamber. The mesh retainer may expose the salt-based deterrent sufficiently to prevent or substantially deter terrestrial molluscs from traversing the dry chamber and surmounting the terrestrial mollusc barrier.

A plastic mesh may be extruded, oriented, expanded, woven or tubular. A mesh may be made from polypropylene, polyethylene, nylon, PVC, PTFE, fabric, any of a wide variety of metals and/or alloys, combinations of materials, and/or other suitable materials. A mesh, such as a metal mesh, may be woven, knitted, welded, expanded, photo-chemically etched or electroformed (screen filter) from steel or other metals.

A mesh may comprise loosely woven or knitted fabric that has a large number of closely spaced holes. A mesh may comprise a fiberglass mesh that is a woven, crisscross pattern of fiberglass thread used to create new products such as tape and filters. The mesh may include a PVC coating. The PVC coating may make it stronger and/or last longer.

The inverted dry chamber may reduce the amount of water and/or other moisture that would otherwise dilute or destroy the mollusc deterrent. Thus, the inverted dry chamber may substantially enhance the life of the mollusc deterrent and/or mollusc bait by reducing exposure to moisture, irrigation water, rain water, and/or other moisture sources.

In various embodiments, the mollusc deterrent may be salt, such as rock salt. In other embodiments, salt-based mixtures may be used in addition or alternatively to pure salt. In some embodiments, terrestrial mollusc baits and/or poisons may be utilized in addition to or alternative to salt or salt-based deterrents.

In some embodiments, a terrestrial mollusc barrier may be secured directly within the ground. In other embodiments, the terrestrial mollusc barrier may be secured to an existing landscape barrier. One or more sections of a terrestrial mollusc barrier may be contiguously joined to create a protected region within which terrestrial molluscs are unable to enter or substantially deterred from entering. Thus, rather than killing terrestrial molluscs after they have entered a planted region, the present systems and methods prevent or substantially deter terrestrial molluscs from ever entering a protected region.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Reference throughout this specification to "one embodiment" or "an embodiment" means that a particular feature, structure, or characteristic described in connection with the embodiment is included in at least one possible implementation. Thus, the phrases "in various embodiments" and "in some embodiments" appearing throughout this specification are not necessarily all referring to the same embodiment. However, all possible combinations and permutations of each of the described embodiments are contemplated as possible embodiments.

The phrases "connected to" and "integral with" and other related terms refer to any form of interaction between two or more components, including mechanical, electrical, magnetic, and electromagnetic interaction. Two components may be connected to each other, even though they are not in direct contact with each other, and even though there may be intermediary devices between the two components.

Various manufacturing techniques, materials, and combinations thereof may be used to create and/or enhance the barriers described herein. It is appreciated that the described barriers and/or portions thereof may be manufactured using various metals, plastics, rubbers, etc. For example, one or more of the following materials may be utilized: polyethylene terephthalate, polystyrene, polyvinyl chloride, polytetrafluoroethylene, polyvinylidine chloride, polyethylene (LDPE and HDPE), polypropylene, and/or other types of plastics and rubbers. Various manufacturing processes may be utilized as well, including, but not limited to, extrusion, injection molding, blow molding, rotational molding, three-dimensional printing, casting, etching, molding, joining, evaporative-pattern casting, spray forming, dip molding, thermoforming, and/or other processes.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

Figure 1A:
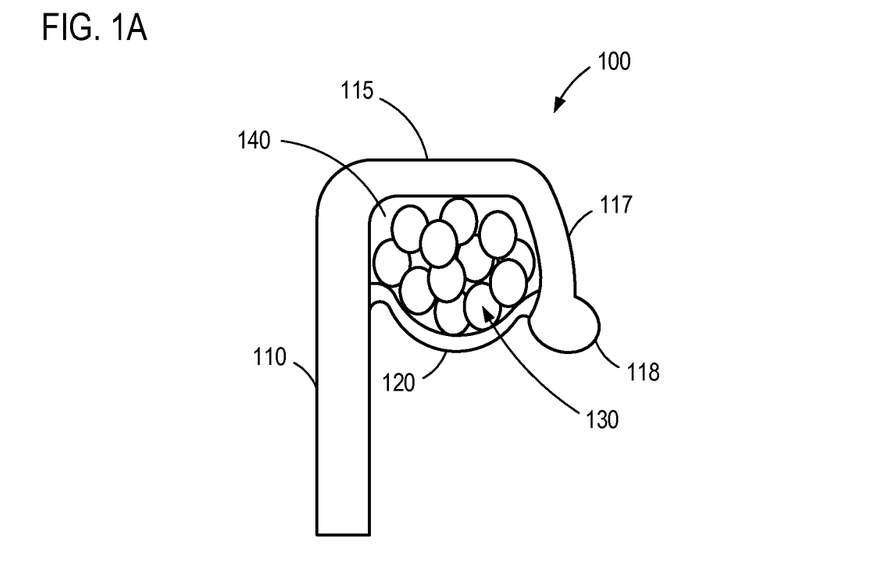
FIG. 1A illustrates a cut-away side view of an embodiment of a terrestrial mollusc barrier, including a dry chamber filled with a mollusc deterrent.

FIG. 1A is a cut-away side view of a terrestrial mollusc barrier 100, including a dry chamber 140 filled, or at least partially filled, with a mollusc deterrent 130, such as a salt or salt-based deterrent. In alternative embodiments, the mollusc deterrent 130 may be replaced with a bait and/or poison. As illustrated, the mollusc barrier 100 may include an inner wall portion 110, a top portion 115, a downward depending portion 117, and an (optional) drip edge 118. In various embodiments, the inner wall portion 110 may extend downward farther than the downward depending portion 117. In other embodiments, the inner wall portion 110 may extend downward slightly more than, the same amount as, or slightly less than the downward depending portion 117.

Although illustrated as being substantially vertical, the inner wall portion 110 need not extend vertically from the ground or from an existing landscape barrier. Rather, the inner wall portion 110 may extend at an angle from the ground or from an existing landscape barrier, a ground stake, or another securing member. The inner wall portion 110 may be secured within the ground and/or to an existing landscape barrier or other ground securing feature, such as a ground stake, wire, rock, stand, base support, or the like.

As illustrated, a retainer 120, such as a plastic mesh, may extend between the downward depending portion 117 and the inner wall portion 110. In some embodiments, a top portion 115 may connect downward depending portion 117 and inner wall portion 110. In various embodiments, one or more of the labeled portions may be manufactured as discrete connectible portions. Alternatively, one or more of the labeled portions may be manufactured as unitary components. The retainer 120 may retain a mollusc deterrent 130 within the dry chamber 140. As described herein, the inverted channel formed by the inner wall portion 110 and the downward depending portion 117 may define the dry chamber 140. The retainer 120 may sufficiently expose the mollusc deterrent 130 to prevent and/or substantially deter terrestrial molluscs from traversing the dry chamber 140 and/or surmounting the terrestrial mollusc barrier 100.

Figure 1B:
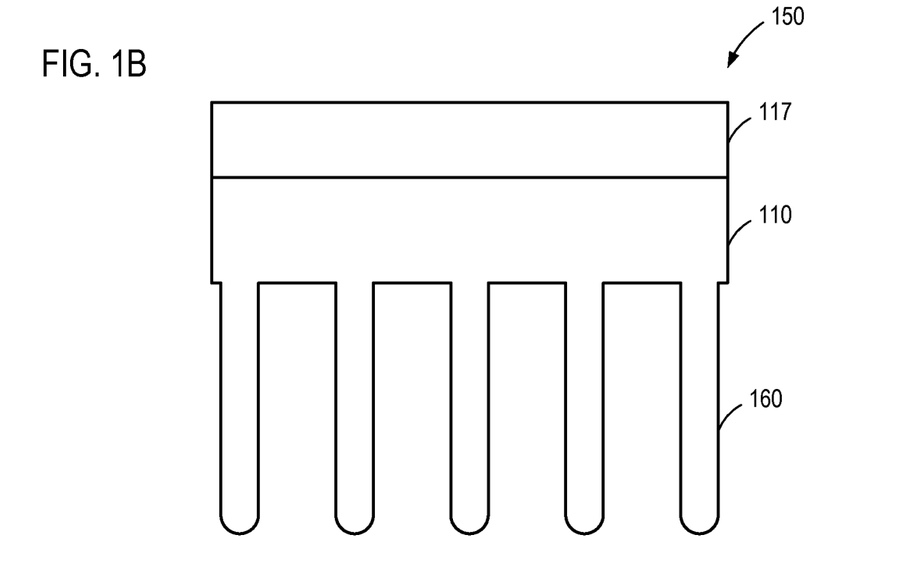
FIG. 1B illustrates a front view of a section of a terrestrial mollusc barrier that includes stakes.

FIG. 1B is a front view of a section of a terrestrial mollusc barrier 150 that includes stakes 160. The stakes 160 may be integrated or attached to the inner wall portion 110 of the terrestrial mollusc barrier 150. A downward depending portion 117 may extend away from the inner wall portion 110 and downward. In some embodiments, the terrestrial mollusc barrier 150 may include a top portion 115 to form the dry chamber 140. In other embodiments, the top portion 115 may be integral with the inner wall portion 110 and/or the downward depending portion 117. In various embodiments, any number of the components may be manufactured as a single component.

Figure 2A:
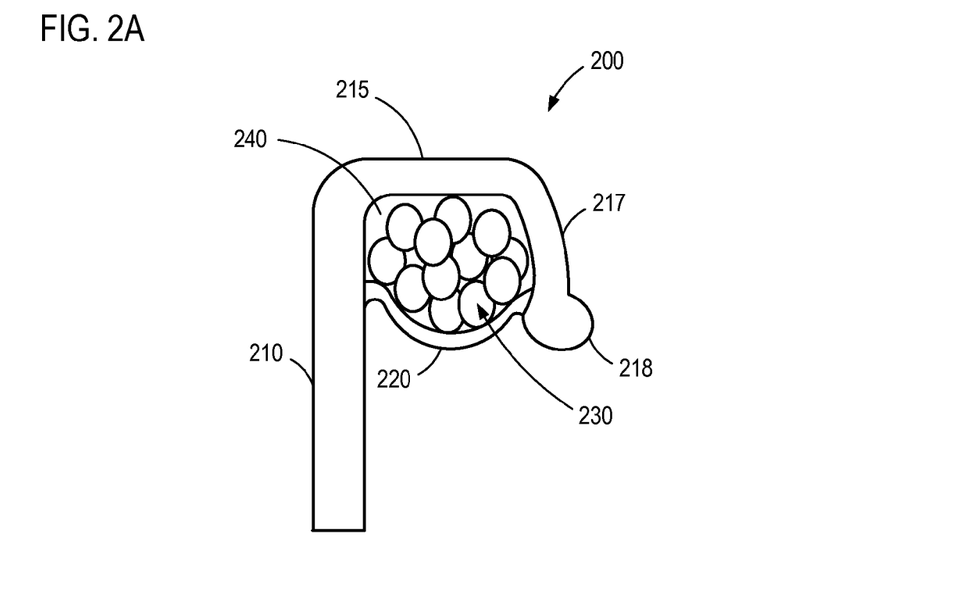
FIG. 2A illustrates a cut-away side view of a terrestrial mollusc barrier similar to that of FIG. 1A.

FIG. 2A is a cut-away side view of a terrestrial mollusc barrier 200 similar to that of FIG. 1A. As illustrated, a dry chamber 240 is filled, or at least partially filled, with a mollusc deterrent 230, such as a salt or salt-based deterrent. In alternative embodiments, the mollusc deterrent 230 may be replaced with a bait and/or poison. As illustrated, the mollusc barrier 200 may include an inner wall portion 210, a top portion 215, a downward depending portion 217, and an (optional) drip edge 218.

As illustrated, a retainer 220, such as a plastic mesh, may extend between the downward depending portion 217 and the inner wall portion 210. The retainer 220 may retain a mollusc deterrent 230 within the dry chamber 240. The retainer 220 may sufficiently expose the mollusc deterrent 230 to prevent and/or substantially deter terrestrial molluscs from traversing the dry chamber 240 and/or surmounting the terrestrial mollusc barrier 200.

Figure 2B:
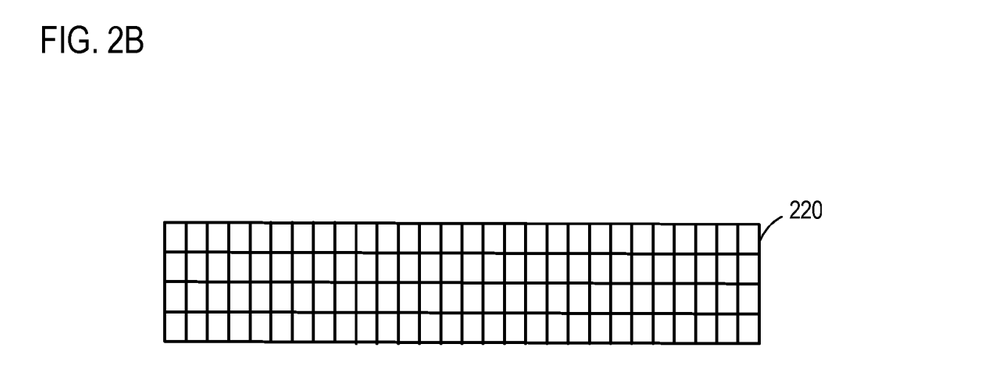
FIG. 2B illustrates one embodiment of a mesh for retaining a mollusc deterrent within a dry chamber of a terrestrial mollusc barrier.

FIG. 2B illustrates one embodiment of a mesh retainer 220 for retaining the mollusc deterrent 230 within the dry chamber 240 of the terrestrial mollusc barrier 200. As illustrated, the mesh retainer 220 may include apertures (e.g., round, oval, square, rectangular, rhombus-shaped, or the like) to retain the mollusc deterrent 230 within the dry chamber 240 while sufficiently exposing the mollusc deterrent 230 to prevent, discourage, and/or deter terrestrial molluscs from traversing the dry chamber 240 and surmounting the terrestrial mollusc barrier 200.

Figure 3A:
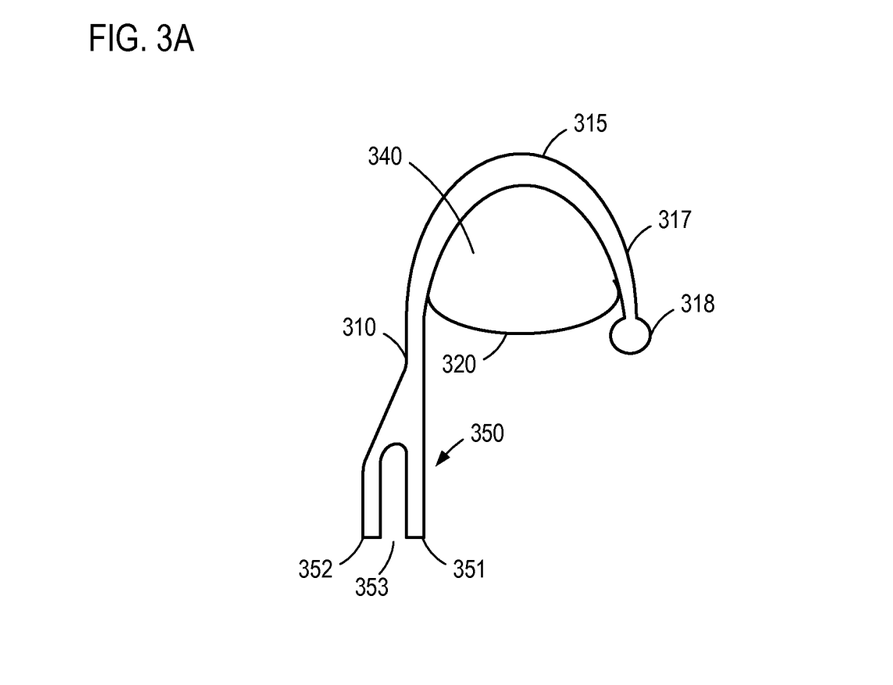
FIG. 3A illustrates one embodiment of a terrestrial mollusc barrier configured for attachment to an existing landscape barrier.

FIG. 3A illustrates one embodiment of a terrestrial mollusc barrier configured for attachment to an existing landscape barrier. As illustrated, the barrier may form a dry chamber 340 via a downward depending portion 317, a top portion 315, and an inner wall portion 310. A mollusc deterrent may be retained within the dry chamber 340 via a retainer 320, such as a plastic mesh, cloth, salt-permeable material, and/or the like. In some embodiments, the retainer 320 may directly expose a mollusc deterrent to traversing molluscs. In other embodiments, the retainer 320 may allow salt, a salt-based deterrent, a poison, a bait, and/or a mollusc deterrent to leach into or otherwise permeate an exposed surface of the retainer 320. For example, salt may permeate through a cloth such that some salt is exposed on the underside of the cloth retainer, while a majority of reserve salt is retained within the dry chamber 340.

The inner wall portion 310 may include an integral, permanently attached, semi-permanently attached, or selectively attachable/detachable attachment member 350. In some embodiments, the inner wall portion may be shorter than illustrated, such that the attachment member 350 may be configured to effectively secure an inverted channel (forming the dry chamber 340). The attachment member 350 may be configured or adapted for securing the terrestrial mollusc barrier to an existing landscape barrier. As illustrated, the attachment member 350 may include an elongated gap 353 disposed between two legs 351 and 352. In various embodiments, the attachment member 350 may clip onto an existing landscape barrier by positioning the attachment legs 351 and 352 on either side of a portion of the existing landscape barrier. In some embodiments, the attachment member 350 may extend the length of the terrestrial mollusc barrier. In other embodiments, a plurality of attachment members 350 may be spaced at regular or irregular intervals along the length of a section of the terrestrial mollusc barrier. In some embodiments, the inverted dry chamber may be fastened to an existing landscape barrier, such as wooden boards used to define a garden perimeter.

Figure 3B:
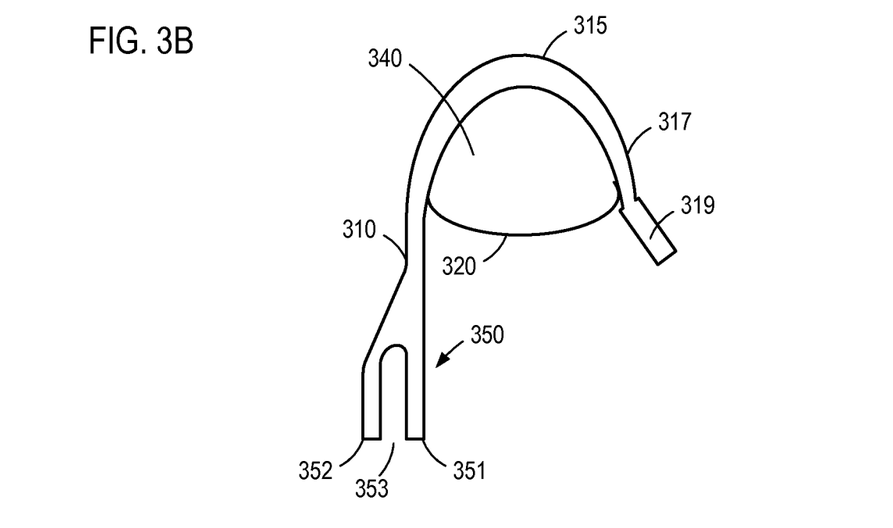
FIG. 3B illustrates one embodiment of a terrestrial mollusc barrier with an alternative drip feature.

FIG. 3A also illustrates a drip bead 318 for directing the flow of water from the top/outer surface of the dry chamber 340. The drip bead 318 may prevent water or other moisture from wicking up into the dry chamber 340. Any of a wide variety of alterative drip features may be used instead of drip bead 318 to prevent water from wicking into the dry chamber 340 of the inverted channel. FIG. 3B illustrates an embodiment of a terrestrial mollusc barrier similar to that shown in FIG. 3A with an alternative drip feature, a drip edge 319.

Figure 3C:
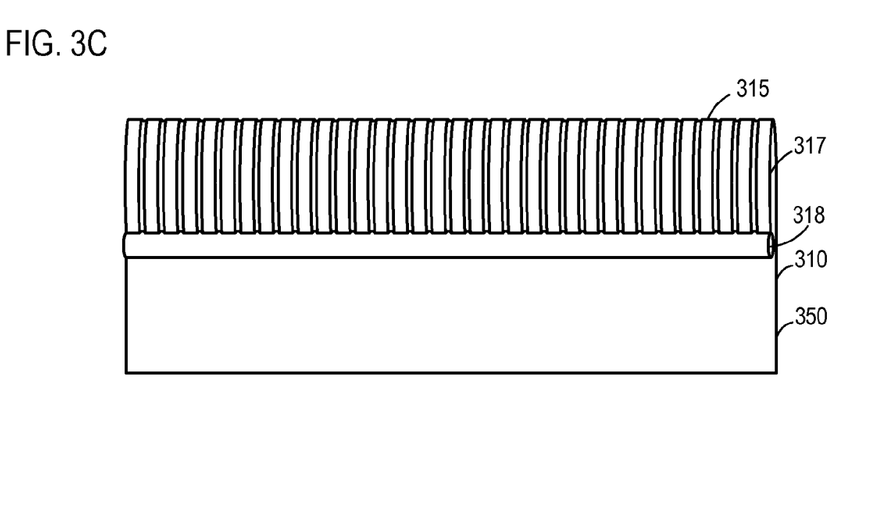
FIG. 3C illustrates a front view of a section of a terrestrial mollusc barrier.

FIG. 3C is a front view of a section of a terrestrial mollusc barrier, including a drip bead 318, a downward depending portion 317, a top portion 315, an inner wall portion 310, and an attachment member 350. The attachment member 350 may be secured within the ground, or may alternatively be secured to an existing landscape barrier. In some embodiments, the attachment member 350 may include one or more integral or selectively attachable stakes. For instance, stakes specifically designed to be positioned within the gap 353 may be utilized for securing the terrestrial mollusc barrier directly within the ground instead of to an existing landscape barrier.

Figure 3D:
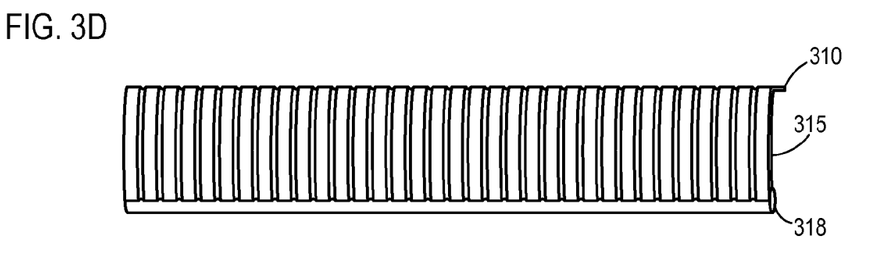
FIG. 3D illustrates a top view of a section of a terrestrial mollusc barrier.

FIG. 3D is a top view of a section of a terrestrial mollusc barrier, including the drip bead 318, the top portion 315, and the top edge of the inner wall portion 310.

Figure 3E:
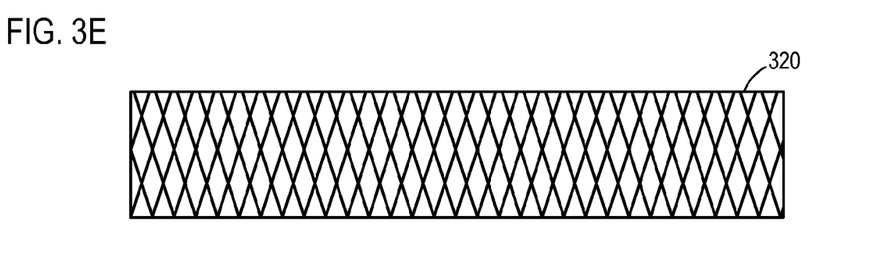
FIG. 3E illustrates an embodiment of a section of mesh for retaining a mollusc deterrent within a dry chamber of a terrestrial mollusc barrier.

FIG. 3E illustrates an embodiment of a section of a mesh retainer 320 for retaining a mollusc deterrent within the dry chamber 340 of a terrestrial mollusc barrier. In various embodiments, the mesh may be a wire mesh, a stainless steel mesh, a plastic mesh, a carbon fiber mesh, a nylon mesh, and/or any other material. In may be preferable to use a material for the mesh that is not easily corroded by salt and/or the elements.

Figure 4:
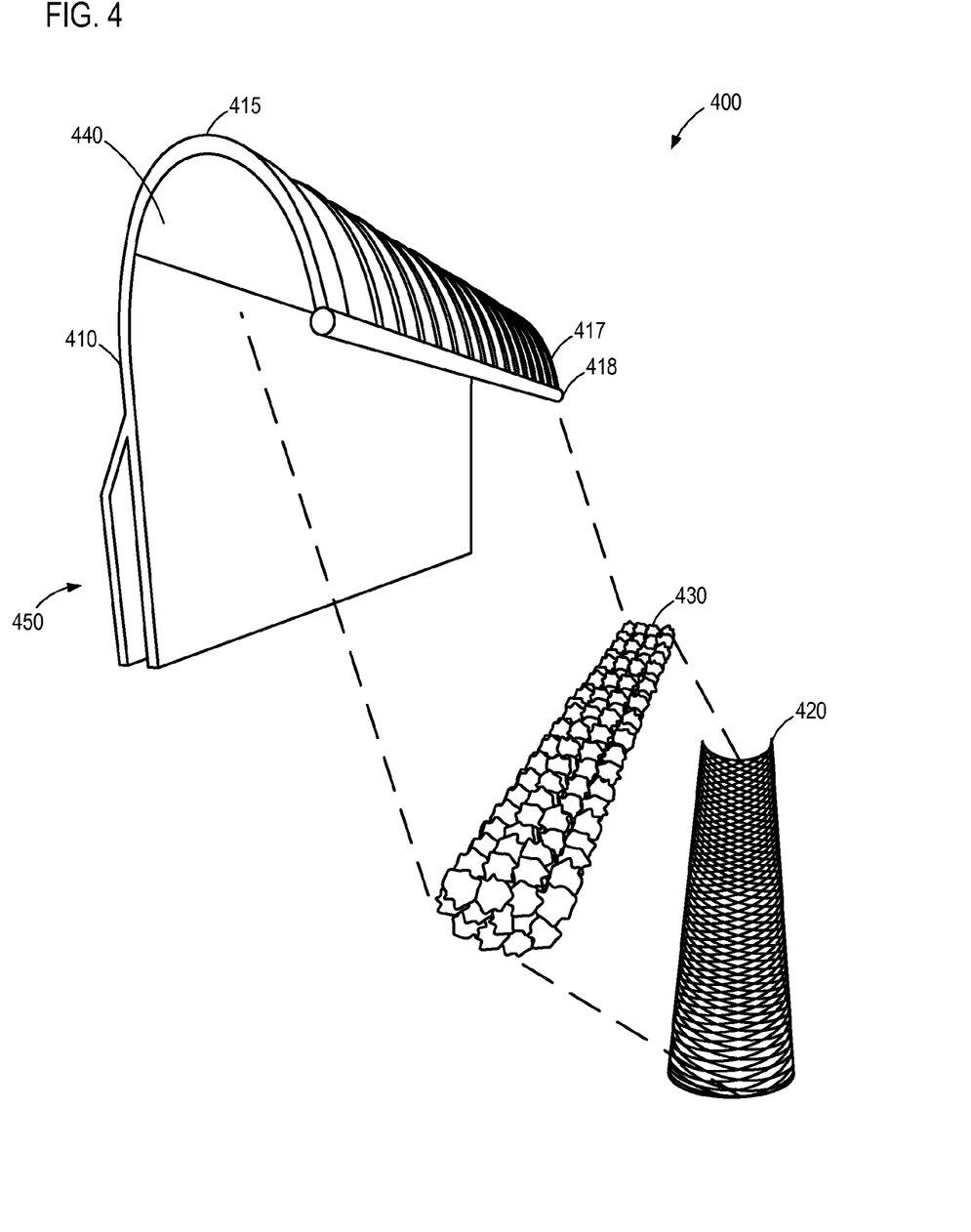
FIG. 4 illustrates a perspective view of various components of an embodiment of a section of a terrestrial mollusc barrier configured for attachment to an existing landscape barrier.

FIG. 4 is a perspective view of various components of an embodiment of a section of a terrestrial mollusc barrier 400 configured for attachment to an existing landscape barrier. The attachment member 450 may be used to secure the terrestrial mollusc barrier 400 to an existing landscape barrier, may be directly buried within the ground, or may be attached to stakes or other ground-penetrating or fixed features.

As illustrated, the terrestrial mollusc barrier 400 includes an inner wall portion 410, a top portion 415, and a downward depending portion 417 that work in concert to form an inverted dry chamber 440. The dry chamber 440 may be configured to selectively retain a mollusc deterrent 430. A mesh retainer 420 or other retainer may retain the mollusc deterrent 430 within the dry chamber 440. In various embodiments, the retainer 420 may be removed and the mollusc deterrent 430 may be refilled. While the illustrated section of the terrestrial mollusc barrier 400 is straight, the section may alternatively be flexible and/or manufactured in predetermined curved sections. In various embodiments, a large section of a terrestrial mollusc barrier 400 may be curved sufficiently for the two ends to join, thereby forming a perimeter around a protected region.

Figure 5:
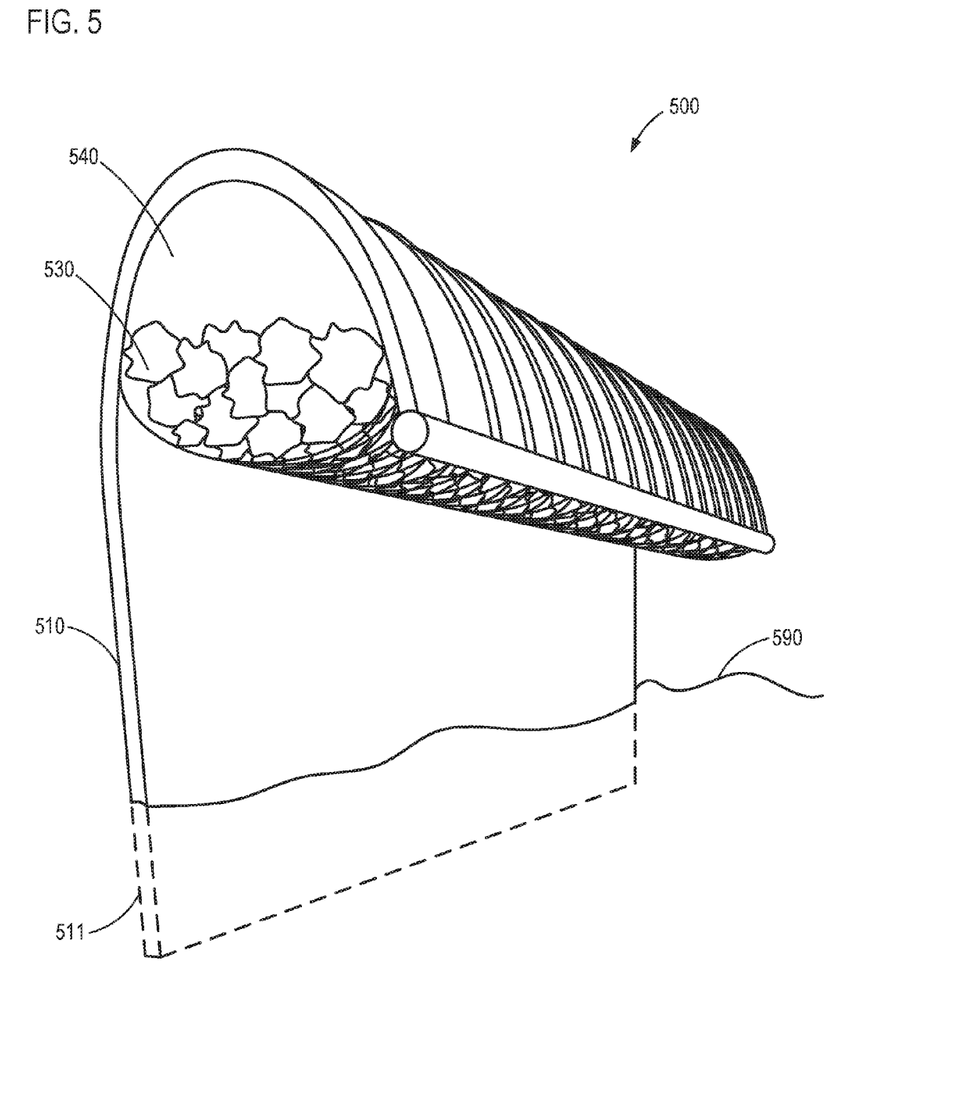
FIG. 5 illustrates a perspective view of an embodiment of a section of a terrestrial mollusc barrier secured within the ground.

FIG. 5 is a perspective view of an embodiment of a section of a terrestrial mollusc barrier 500 secured within the ground 590. A portion 511 of the inner wall portion 510 may be buried within the ground 590. In some embodiments, the portion 511 may have inverted or angled portions to make its removal from the ground 590 more difficult. In some embodiments, the portion 511 may include one or more spikes, stakes, or other features to facilitate ground penetration. In various embodiments, the terrestrial mollusc barrier 500 includes an inverted dry chamber 540 configured to secure a mollusc deterrent 530 and/or other bait or poison.

Figure 6:
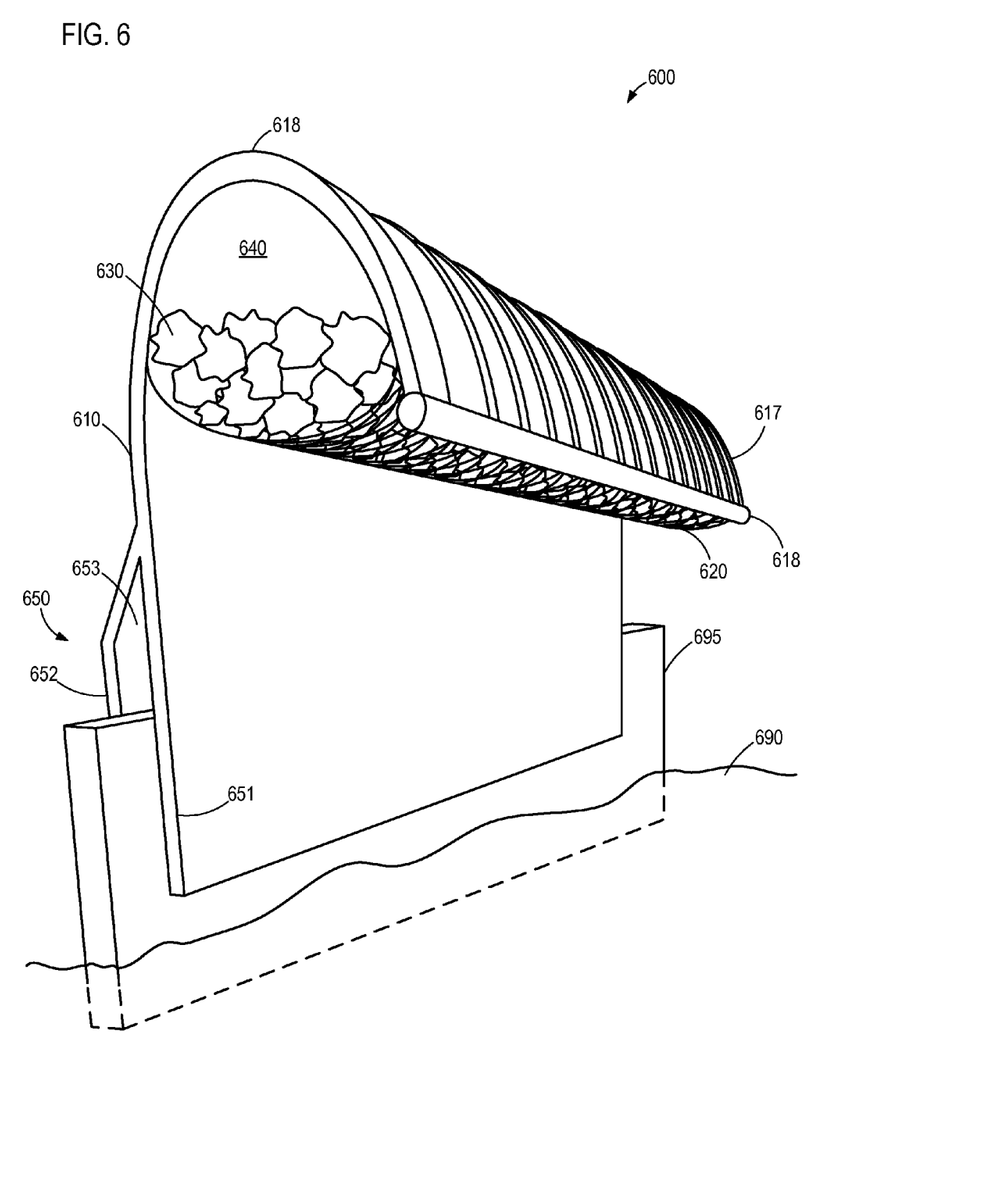
FIG. 6 illustrates a perspective view of an embodiment of a section of a terrestrial mollusc barrier attached to an existing landscape barrier.

FIG. 6 is a perspective view of an embodiment of a section of a terrestrial mollusc barrier 600 attached to an existing landscape barrier 695. The terrestrial mollusc barrier 600 may be similar to those described in FIGS. 3A, 3B, and 4. For example, the terrestrial mollusc barrier 600 may include a dry chamber 640 formed by an inner wall portion 610, a top portion 615, and a downward depending portion 617. A drip edge or drip bead 618 may divert water or other moisture to reduce wicking into the dry chamber 640. A mesh retainer 620 may retain a mollusc deterrent 630 within the dry chamber 640. An elongated section of the terrestrial mollusc barrier 600 may be secured to the existing landscape barrier 695 by positioning legs 651 and 652 on either side of the existing landscape barrier 695, such that the existing landscape barrier 695 is fitted within gap 653.

An attachment member 650 is illustrated as being continuous along the length of the terrestrial mollusc barrier 600. However, in various embodiments, the attachment member 650 may have gaps or comprise multiple attachment features positioned at various intervals along the terrestrial mollusc barrier 600. Additionally, in various embodiments, the attachment member 650 may be selectively attached or permanently attached to the inner wall portion 610. Thus, although the attachment member 650 is illustrated as integral, it may, in some embodiments, be a separate piece permanently or detachably joined to the inner wall portion 610.

Figure 7:
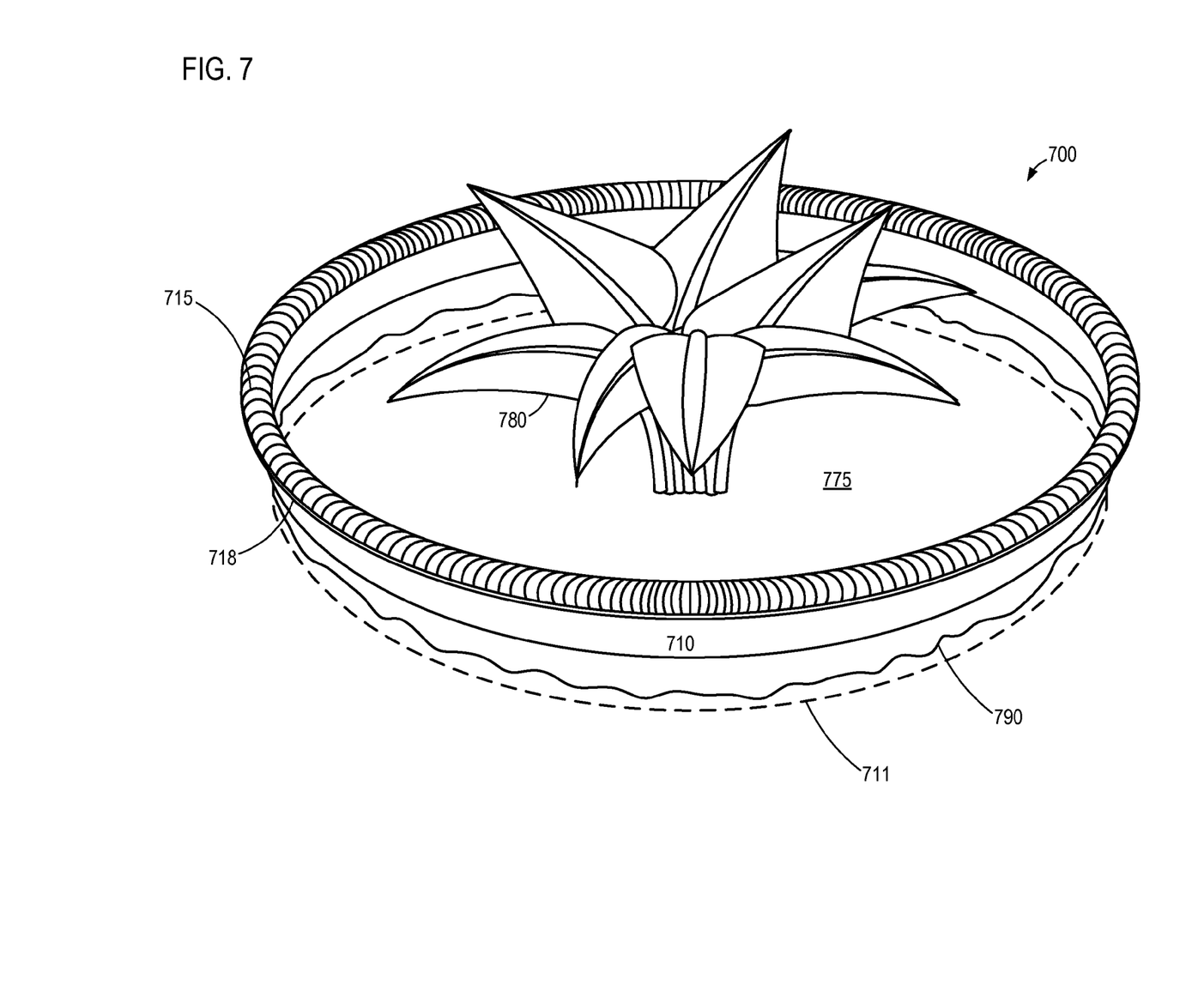
FIG. 7 illustrates a perspective view of an embodiment of a terrestrial mollusc barrier secured within the ground to define a protected region.

FIG. 7 is a perspective view of a terrestrial mollusc barrier 700 secured within or to the ground. The terrestrial mollusc barrier 700 is continuous so as to define a protected region 775. The top portion 715 of the terrestrial mollusc barrier 700 may help form a dry chamber within which a mollusc deterrent is retained. A drip edge or drip bead 718 may help prevent water or other moisture from wicking into the dry chamber. A portion 711 of an inner wall portion 710 of the terrestrial mollusc barrier 700 may be interred within the ground 790. The protected region 775 may house one or more plants 780, such as hostas or other plants susceptible to damage from terrestrial molluscs like snails and slugs.

Figure 8:
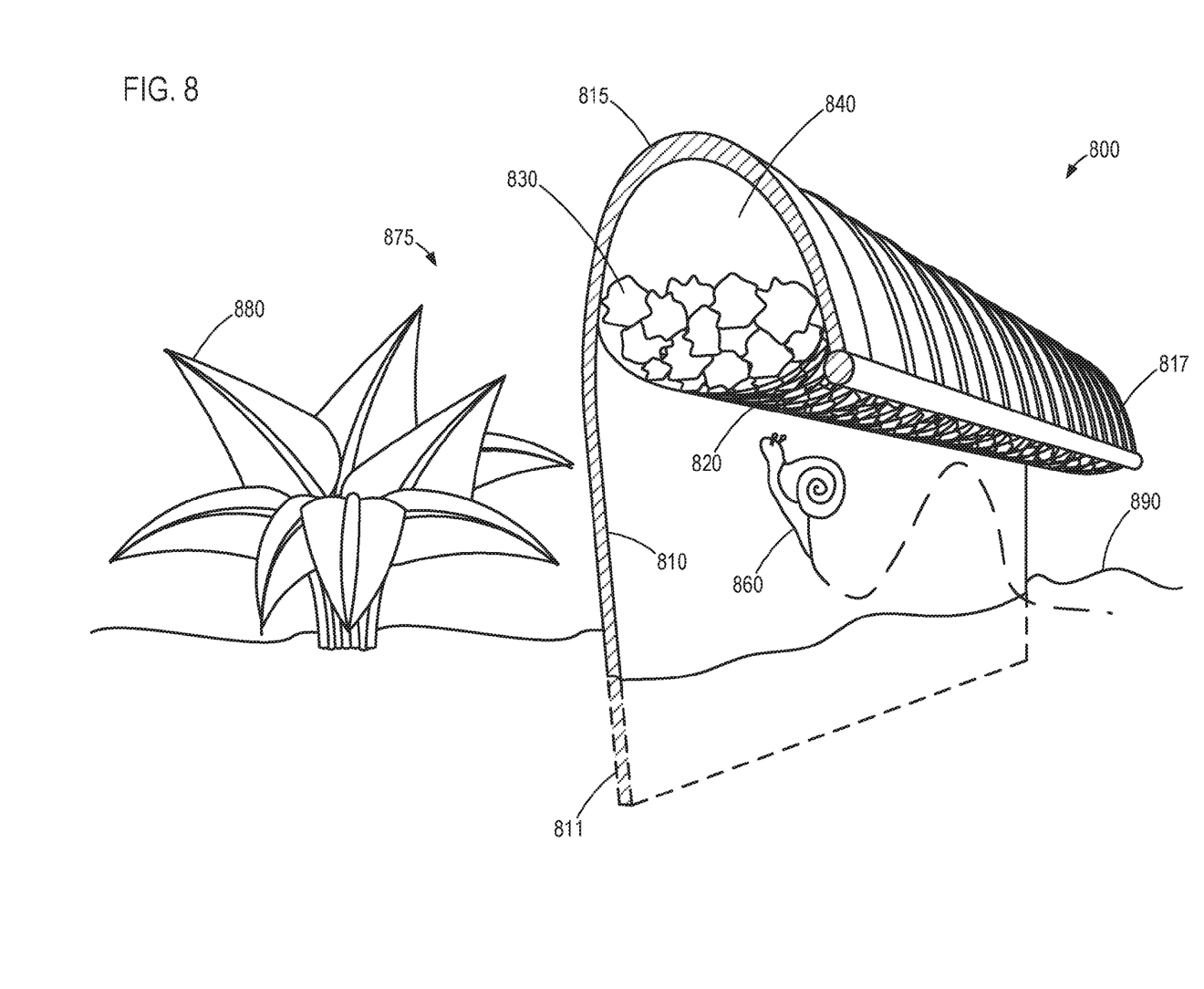
FIG. 8 illustrates a cross-sectional view of a portion of a terrestrial mollusc barrier preventing a terrestrial mollusc from entering a protected region.

FIG. 8 is a cross-sectional view of a portion of a terrestrial mollusc barrier 800, similar to the one illustrated in FIG. 7. As illustrated, the terrestrial mollusc barrier 800 is configured to prevent a terrestrial mollusc 860 from entering a protected region 875 and destroying a plant 880. The terrestrial mollusc barrier 800 may include an interred portion of an inner wall portion 810, which in connection with a top portion 815 and a downward depending portion 817 forms a dry chamber 840. As the terrestrial mollusc 860 attempts to surmount the barrier 800, the terrestrial mollusc 860 will be forced to try to cross/traverse the dry chamber 840 via the mesh retainer 820. The mollusc deterrent 830 may be exposed through the mesh retainer 820 and substantially deter or even prevent the terrestrial mollusc 860 from crossing the mesh retainer 820. For example, a salt-based deterrent may protrude partially through the mesh retainer 820 and contact the terrestrial mollusc 860 as it attempts to traverse the dry chamber 840. The terrestrial mollusc 860 may not tolerate contact with the salt and instead may desist from surmounting the terrestrial mollusc barrier 800.

Figure 9:
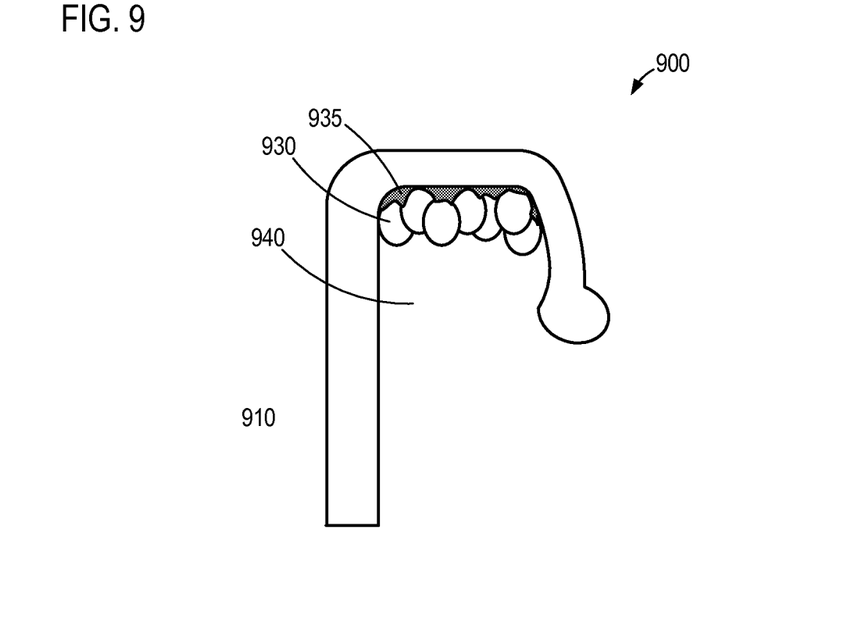
FIG. 9 illustrates an alternative embodiment in which an alternative retainer is used to retain a mollusc deterrent within a dry chamber of a terrestrial mollusc barrier.

FIG. 9 illustrates an alternative embodiment in which an alternative retainer 935 is used to retain a mollusc deterrent 930 within a dry chamber 940 of a terrestrial mollusc barrier 900. In the illustrated embodiment, an adhesive may be used to secure the mollusc deterrent 930 to the roof of the dry chamber 940. The adhesive may comprise a mechanical or chemical adhesive. Though illustrated as rounded particles, mollusc deterrents, including mollusc deterrent 930, may be a continuous block, gel, or other shape or composition suitable to deter molluscs from traversing the dry chamber 940.

Figure 10:
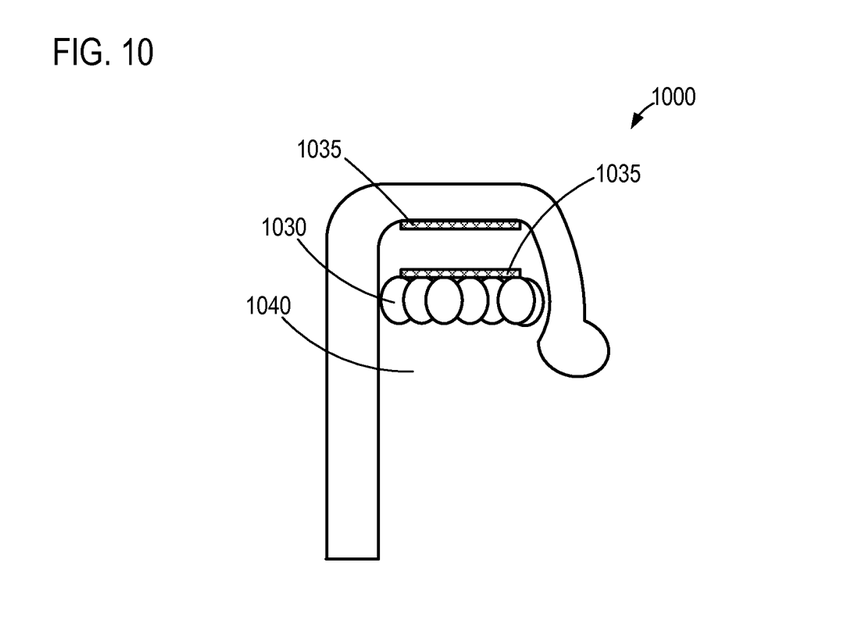
FIG. 10 illustrates another alternative embodiment of a retainer for retaining a mollusc deterrent within a dry chamber of a terrestrial mollusc barrier.

FIG. 10 illustrates another alternative embodiment of a two-part retainer 1035 for retaining a mollusc deterrent 1030 within a dry chamber 1040 of a terrestrial mollusc barrier 1000. For example, the two-part retainer 1035 may comprise a hook-and-loop fastener, with one side secured to the mollusc deterrent 1030 and the other side secured to an inner portion (e.g., the top) of the dry chamber 1040.

Figure 11:
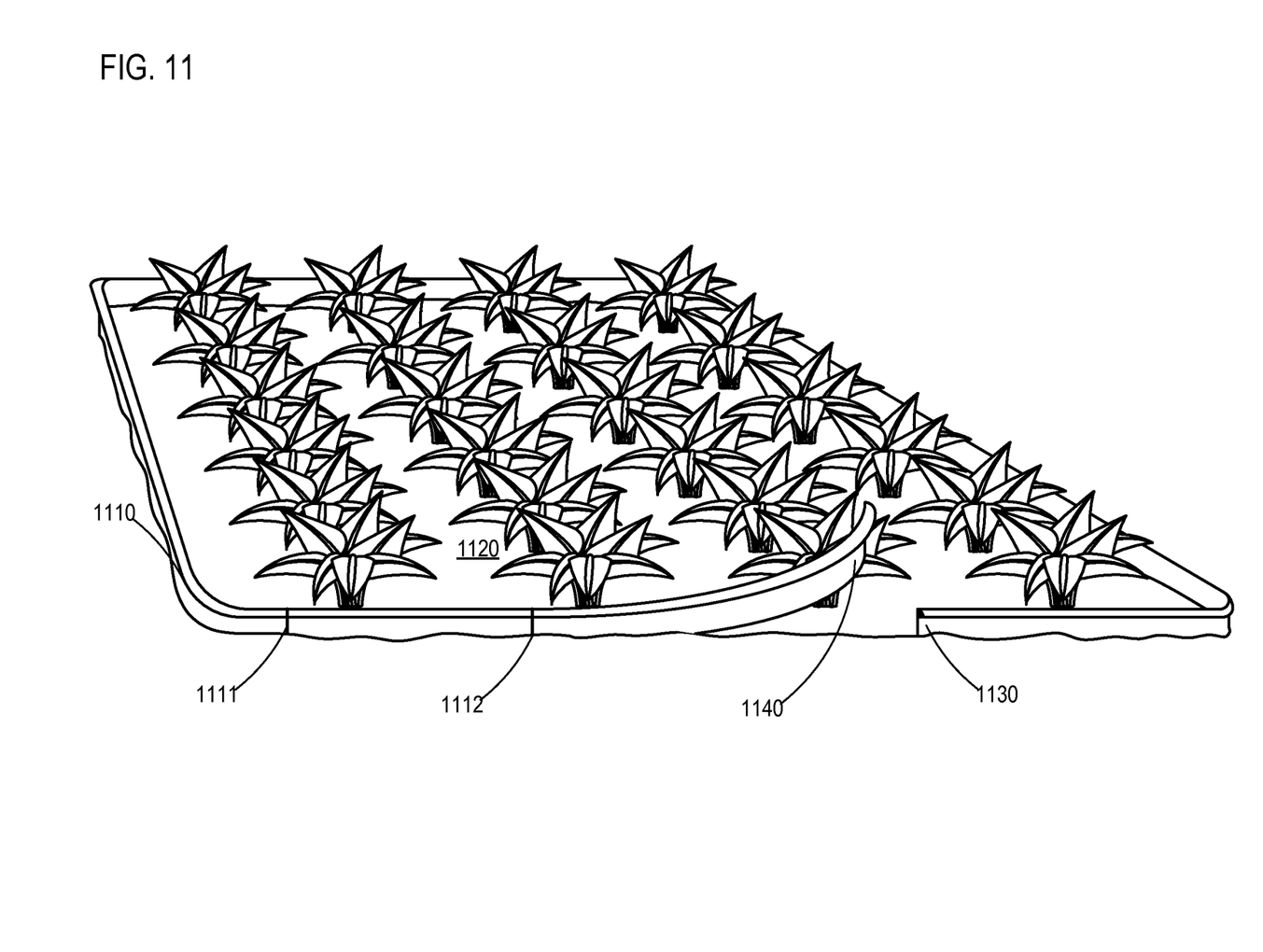
FIG. 11 illustrates a continuous section of a terrestrial mollusc barrier encompassing an agricultural area of crops.

FIG. 11 illustrates a continuous section of a terrestrial mollusc barrier 1110 encompassing/enclosing an agricultural region 1120 of crops. As illustrated, the terrestrial mollusc barrier 1110 may comprise one or more connected 1111 and 1112 sections. In some embodiments, the barrier may be provided on a continuous roll instead of comprising sections. In various embodiments, each section may be between 1 and 10 feet long and may selectively removable and/or replaceable.

In the illustrated embodiments, a final section 1140 has not yet been connected to an edge 1130 to fully enclose the agricultural region 1120. Each section may be configured to connect to another section or attachment members may be used to connect them together. In some embodiments, the sections may simply be aligned close to one another but not actually connected.

The size, height, width, and material composition/thickness may vary based on an intended use and/or to fit a specific purpose. For example, in a home or business environment, the terrestrial mollusc barrier 1110 may be relatively unobtrusive and sized just large enough to prevent terrestrial molluscs from entering the region 1120. In an agricultural setting, the terrestrial mollusc barrier 1110 may be much larger, thicker, and/or configured to be more durable. For example, the height of terrestrial mollusc barrier 1110 may be larger, the width of an inverted channel may be increased, the amount of salt or other mollusc deterrent contained therein may be increased, and/or the overall durability may be increased.

This disclosure has been made with reference to various exemplary embodiments, including the best mode. However, it is appreciated that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

Thus, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. An elongated terrestrial mollusc barrier for deterring terrestrial molluscs from entering a protected region, comprising:
   an elongated wall portion configured to extend from a surface along a length of a perimeter of a region to be protected;
   an attachment member configured to attach the elongated wall portion to a landscape barrier;
   a granular mollusc deterrent;
   an inverted channel defined by at least a portion of the wall portion and a downward depending barrier portion, wherein the inverted channel is configured to receive the granular mollusc deterrent, and wherein the downward depending barrier portion is configured to reduce liquid intrusion and dissolution of the granular mollusc deterrent; and
   a mesh retainer extending along at least a portion of the inverted channel, wherein the mesh retainer has aperture sizes corresponding to a size of the granular mollusc deterrent to retain the granular mollusc deterrent within an inverted dry chamber portion of the inverted channel, such that there is a path for a terrestrial mollusc to directly contact retained mollusc deterrent exposed through the mesh retainer and fall from the retained mollusc deterrent to the surface when the elongated wall portion is substantially vertical, and wherein the mesh retainer exposes at least some of the retained, granular mollusc deterrent along an inverted surface-facing opening of the inverted channel, such that the retained granular mollusc deterrent is configured to directly contact a terrestrial mollusc attempting to surmount the elongated barrier.

2. The terrestrial mollusc barrier of claim 1, wherein the attachment member comprises opposing legs configured to be positioned on either side of the landscape barrier and thereby secure the terrestrial mollusc barrier to the landscape barrier.

3. The terrestrial mollusc barrier of claim 1, wherein the attachment member is integral with the elongated wall portion.

4. The terrestrial mollusc barrier of claim 1, wherein the elongated terrestrial mollusc barrier comprises a plurality of discrete sections connected together to form a continuous elongated terrestrial mollusc barrier that extends along the length of the perimeter of the protected region.

5. The terrestrial mollusc barrier of claim 1, wherein the elongated terrestrial mollusc barrier is configured to deter terrestrial molluscs consisting of slugs and snails from entering the protected region.

6. The terrestrial mollusc barrier of claim 1, wherein the downward depending barrier portion comprises a drip feature configured to prevent moisture from wicking into the inverted dry chamber portion of the inverted channel.

7. The terrestrial mollusc barrier of claim 1, wherein the mesh retainer comprises a plastic mesh retainer configured to secure the mollusc deterrent within the inverted dry chamber portion of the inverted channel.

8. The terrestrial mollusc barrier of claim 1, wherein the retainer comprises an adhesive configured to secure the mollusc deterrent within the inverted dry chamber portion of the inverted channel.

9. A terrestrial mollusc barrier deterrent comprising:
an elongated barrier adapted to extend along a perimeter of an area designated for protection from terrestrial molluscs;
a granular mollusc deterrent;
an attachment member configured to attach said elongated barrier to a pre-installed landscape barrier extending from a surface,
said elongated barrier comprising an outwardly extending and downwardly depending portion creating an inverted dry chamber located opposite said attachment member with respect to said designated area, and
said inverted dry chamber configured to receive the granular mollusc deterrent for deterring terrestrial molluscs from traversing said inverted dry chamber; and
a mesh extending along an inverted portion of said inverted dry chamber, wherein the mesh has aperture sizes corresponding to a size of the granular mollusc deterrent so as to retain said granular mollusc deterrent suspended above the surface of said designated area and within said inverted dry chamber and to provide a path for a terrestrial mollusc to directly contact retained mollusc deterrent exposed through the mesh retainer, such that a terrestrial mollusc can fall from the exposed, suspended, and retained mollusc deterrent to the surface.

10. An elongated barrier for deterring terrestrial molluscs from entering a protected region, comprising:
an elongated wall portion configured to extend along a length of a perimeter of a region to be protected, wherein the wall portion is configured to extend upward from a surface of the protected region;
at least one ground-insertion feature adapted for insertion into the surface and configured to secure the wall portion in an upright state relative to the surface of the protected region;
an inverted channel defined by at least a portion of the wall portion and a a granular mollusc deterrent; downward depending barrier portion, wherein the inverted channel is configured to receive the granular mollusc deterrent proximate an apex of the inverted channel; and
a mesh retainer extending along at least a portion of the inverted channel,
wherein the mesh retainer has apertures corresponding to a size of the granular mollusc deterrent to retain the mollusc deterrent within a dry chamber portion of the inverted channel, and
wherein the mesh retainer is configured to expose at least some of the mollusc deterrent through the mesh apertures along an opening of the inverted channel, such that a mollusc traversing exposed, but retained, mollusc deterrent within the dry chamber can fall from the mollusc deterrent to the surface.

11. The terrestrial mollusc barrier of claim 10, wherein the inverted channel is further defined by a top portion.

12. The terrestrial mollusc barrier of claim 10, wherein a first end of the elongated wall portion is configured to be connected to a second end of the elongated wall portion, such that the elongated terrestrial mollusc barrier forms a continuous terrestrial mollusc barrier around the perimeter of the protected region.

13. The terrestrial mollusc barrier of claim 10, wherein the elongated barrier comprises a plurality of discrete sections connected together to form a continuous elongated barrier that extends along the length of the perimeter of the protected region.

14. The terrestrial mollusc barrier of claim 10, wherein the elongated barrier is configured to deter terrestrial molluscs consisting of slugs and snails from entering the protected region.

15. The terrestrial mollusc barrier of claim 10, wherein the downward depending barrier portion comprises a drip feature configured to prevent moisture from wicking into the dry chamber portion of the inverted channel.

16. The terrestrial mollusc barrier of claim 10, wherein the retainer is configured to retain a mollusc deterrent comprising salt.

17. The terrestrial mollusc barrier of claim 10, wherein the mesh retainer comprises a fiberglass mesh retainer configured to secure the mollusc deterrent within the dry chamber portion of the inverted channel.

18. The terrestrial mollusc barrier of claim 10, wherein the retainer comprises an adhesive configured to secure the mollusc deterrent within the dry chamber portion of the inverted channel.

19. The terrestrial mollusc barrier of claim 10, wherein the ground insertion feature comprises one or more ground stakes.

* * * * *